(12) United States Patent
Noon

(10) Patent No.: US 6,598,311 B2
(45) Date of Patent: Jul. 29, 2003

(54) TAPE MEASURE AND ACCESSORIES

(76) Inventor: Tom Noon, 2562 Indian Grass Rd., Morris, IL (US) 60450

( * ) Notice: Subject to any disclaimer, the term of this patent is extended or adjusted under 35 U.S.C. 154(b) by 80 days.

(21) Appl. No.: 09/817,528

(22) Filed: Mar. 27, 2001

(65) Prior Publication Data

US 2002/0139002 A1 Oct. 3, 2002

(51) Int. Cl.$^7$ ................................................ G01B 3/10
(52) U.S. Cl. .............................. 33/760; 33/488; 33/668
(58) Field of Search ........................ 33/760, 488, 668, 33/42, 348, 347, 27.032, 484, 755, 757, 758, 759, 761, 768, 769, 770

(56) References Cited

U.S. PATENT DOCUMENTS

| | | | | |
|---|---|---|---|---|
| 3,036,791 A | * | 5/1962 | Siggelkow | 33/347 |
| 3,205,584 A | * | 9/1965 | Overaa | 33/760 |
| 3,242,578 A | * | 3/1966 | Moll | 33/761 |
| 3,270,421 A | * | 9/1966 | Jones | 33/759 |
| 4,411,072 A | * | 10/1983 | Rutty et al. | 242/397.5 |
| 4,574,486 A | * | 3/1986 | Drechsler | 33/755 |
| 4,924,597 A | * | 5/1990 | Tursi | 33/758 |
| 4,965,944 A | * | 10/1990 | Kuze et al. | 33/760 |
| 5,172,486 A | * | 12/1992 | Waldherr | 33/27.03 |
| 5,253,421 A | * | 10/1993 | Landmark | 33/27.03 |
| 5,291,664 A | * | 3/1994 | Pinney et al. | 33/485 |
| 5,481,810 A | * | 1/1996 | Hastings et al. | 33/484 |
| 5,735,052 A | * | 4/1998 | Lin | 33/27.03 |
| 5,809,662 A | * | 9/1998 | Skinner | 33/42 |
| 5,842,284 A | * | 12/1998 | Goldman | 33/42 |
| 5,894,675 A | * | 4/1999 | Cericola | 33/286 |
| 6,098,303 A | * | 8/2000 | Vogel | 33/759 |

* cited by examiner

*Primary Examiner*—Christopher W. Fulton
(74) *Attorney, Agent, or Firm*—Ernest Kettelson

(57) ABSTRACT

A tape measure case with coiled measuring tape therein having a miniature builders square provided along one side wall, having a magnifying lens to magnify the numbers and markings on the measuring tape, having a rearwardly extending positioning member with a pivot hole around which the tape measure case and extended measuring tape can be pivoted to mark an arcuate line on a work piece, having a ripping guide member extendable downwardly from the case to bear against the side edge of a board on which a rip saw line is to be marked, having an end piece at the outer free end of the measuring tape that has a V-notch to receive the acute-angled end of a rafter or other work piece to thereby hold the outer end of the tape measure in position hands-free, having the outer free end of the measuring tape magnetized for retrieval of items that have fallen into otherwise difficult locations to reach, having a gradually tapering and thickening outer end portion of the measuring tape to gradually increase frictional engagement with the edges of the entrance slot into the cavity of the tape measure case thereby preventing unduly rapid return of the measuring tape into the case that can damage the tool, and having a measuring tape with two sets of linear measurement numbers facing in opposite directions so they can be read in proper position from either side of the tape measure.

15 Claims, 12 Drawing Sheets

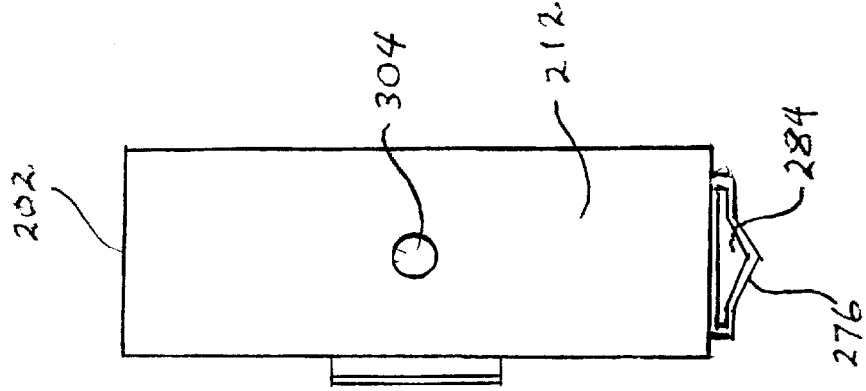
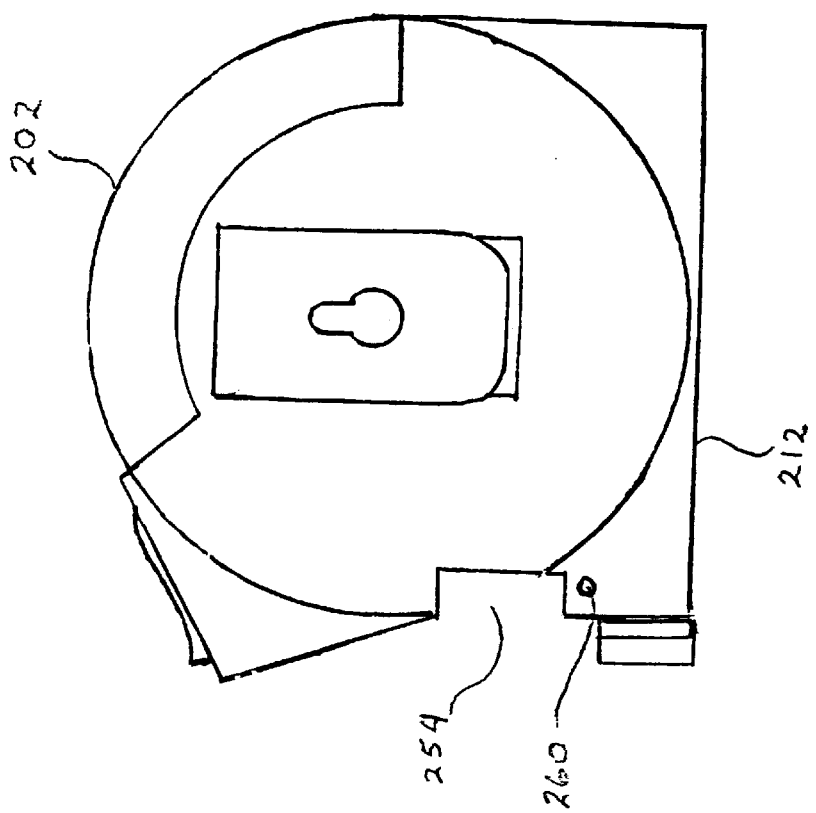

TAPE MEASURE AND ACCESSORIES

FIELD OF THE INVENTION

This invention relates to the field of tape measures and accessories incorporated therein to provide a unitary tool a workman can use to perform a number of related tasks without having to put one tool down and pick another one up, and without having to carry a number of different tools along.

BACKGROUND OF THE INVENTION

A number of tape measures with accessories incorporated therein are known to the prior art. Those shown and described in accordance with the present invention are improvements over those previously known. The prior art devices of this kind known to the inventor include those disclosed in the following United States Patents:

U.S. Pat. No. 4,914,830
U.S. Pat. No. 5,172,486
U.S. Pat. No. 5,735,052
U.S. Pat. No. 6,098,303
U.S. Pat. No. Des. 333,627

SUMMARY OF THE INVENTION

A tape measure with accessories in accordance with the present invention includes a tape measure case with coiled measuring tape therein having a miniature builders square provided along one side wall. The tape measure case also includes a magnifying lens to magnify the numbers and markings on the measuring tape, the lens being mounted in a pivotable carrier on the front wall of the case which includes a receiving recess for the carrier and magnifying lens when not in use and pivoted to the storage position. The carrier with magnifying lens is pivoted out from the receiving recess to an operational position slightly above the extended measuring tape to magnify the number and marking on the tape to indicate how far the tape has been extended. The tape measure and accessories in accordance with this invention also includes a rearwardly extending positioning member with a pivot hole to receive a nail or other pivot pin, around which the tape measure case and extended measuring tape can be pivoted to mark an arcuate line on a work piece. A ripping guide member is also provided on the tape measure case. It is carried in a recess along one side wall of the case, and is extendable outwardly from the recess and downwardly from the case to bear against the side edge of a board on which a rip saw line is to be marked.

An L-shaped end piece is provided at the outer free end of the measuring tape that has a V-notch in its depending flange to receive the acute-angled end of a rafter or other work piece to thereby hold the outer end of the tape measure in position hands-free. The outer free end of the measuring tape is magnetized for retrieval of items that have fallen into otherwise difficult locations to reach, such as a nail or other debris that may have fallen to the bottom of a caisson in which concrete is to be poured.

The measuring tape is provided with a gradually tapering and thickening outer end portion to gradually increase frictional engagement with the edges bordering the entrance slot into the cavity of the tape measure case. The gradually increasing frictional drag slows return of the tape measure into the case, thereby preventing unduly rapid return that often occurs which can damage the tool. The measuring tape in accordance with this invention is provided with two sets of linear measurement numbers facing in opposite directions on the upwardly facing surface of the measuring tape, so they can be read in proper position from either side of the tape measure.

BRIEF DESCRIPTION OF THE DRAWING

FIG. 13 is an elevation view of the opposite side of the tape measure and accessories assembly in accordance with this invention from that on which the rip-saw guide is carried, and with the magnifying glass and carrier removed to show the pivot hole that receives the pivot lugs of the carrier on that opposite side, a corresponding pivot hole being similarly located on the other side of the tape measure case.

FIG. 14 is a bottom plan view of the tape measure and accessories assembly shown in FIG. 13 to show the drainage port in the bottom wall of the tape measure case for draining moisture from the cavity thereof.

DESCRIPTION OF THE PREFERRED EMBODIMENT

Figure 1:
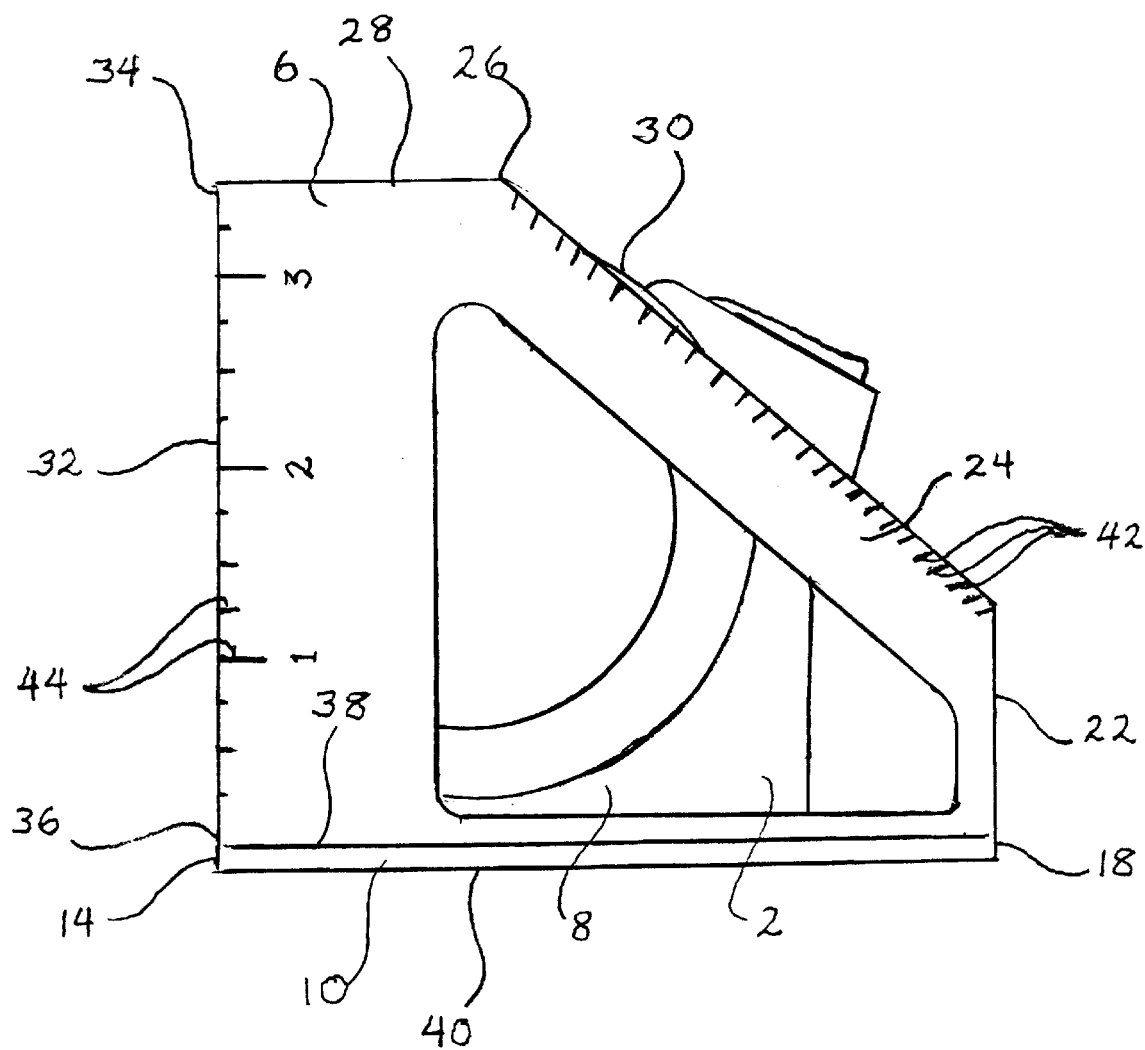
FIG. 1 is an elevation view of the tape measure and accessories in accordance with this invention having a miniature builders square positioned along one side wall of the tape measure case.
Figure 2:
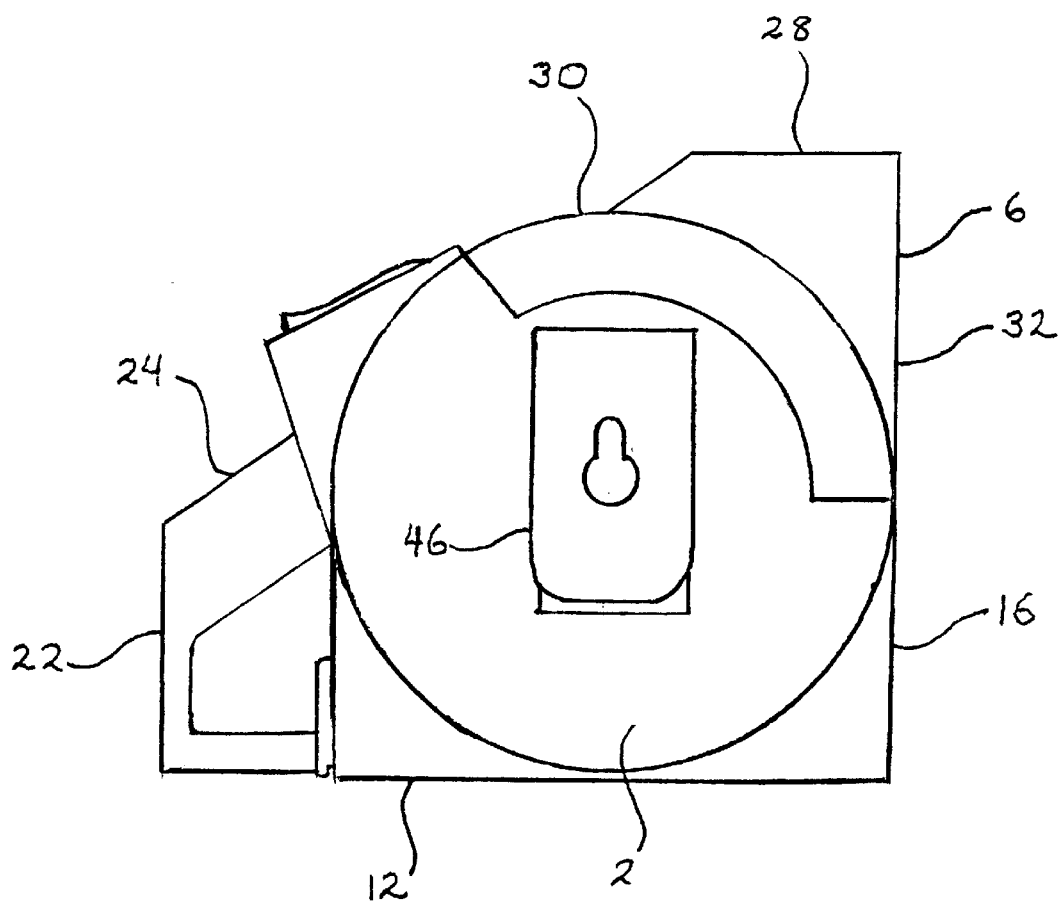
FIG. 2 is an elevation view of the opposite side of the tape measure shown in FIG. 1 having a miniature builders square positioned on one side of the tape measure case.
Figure 3:
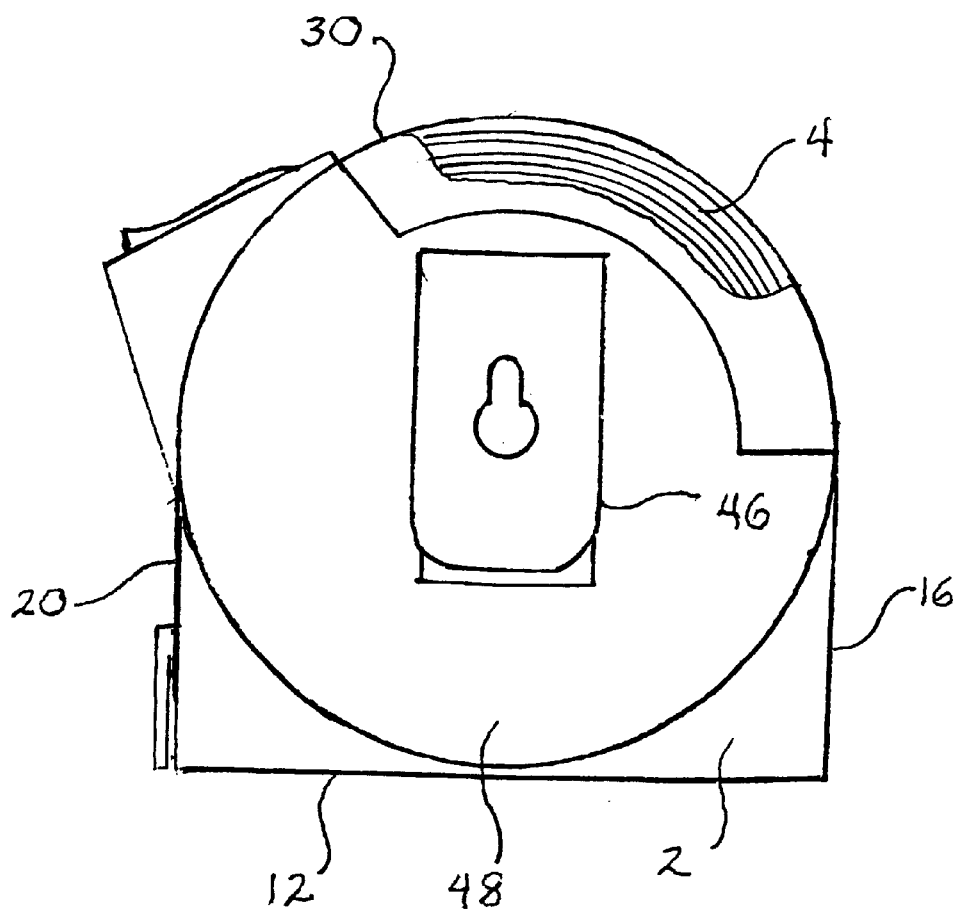
FIG. 3 is an elevation view of a tape measure case in accordance with this invention having a portion of the side wall broken away to illustrate the coiled measuring tape in the cavity thereof, and with the miniature builders square removed.
Figure 4:
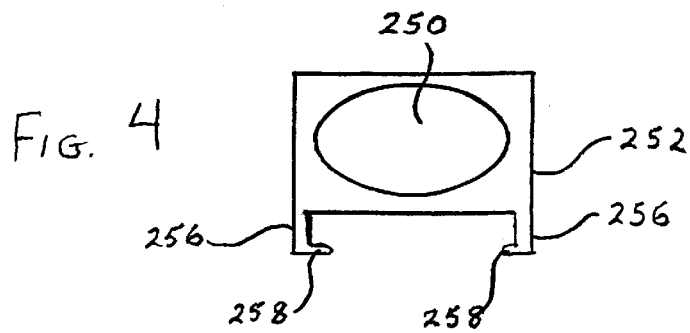
FIG. 4 is a plan view of a magnifying glass and pivotal carrier provided for the measuring tape and accessories in accordance with this invention, shown in place on the tape measure case in FIG. 5.
Figure 5:
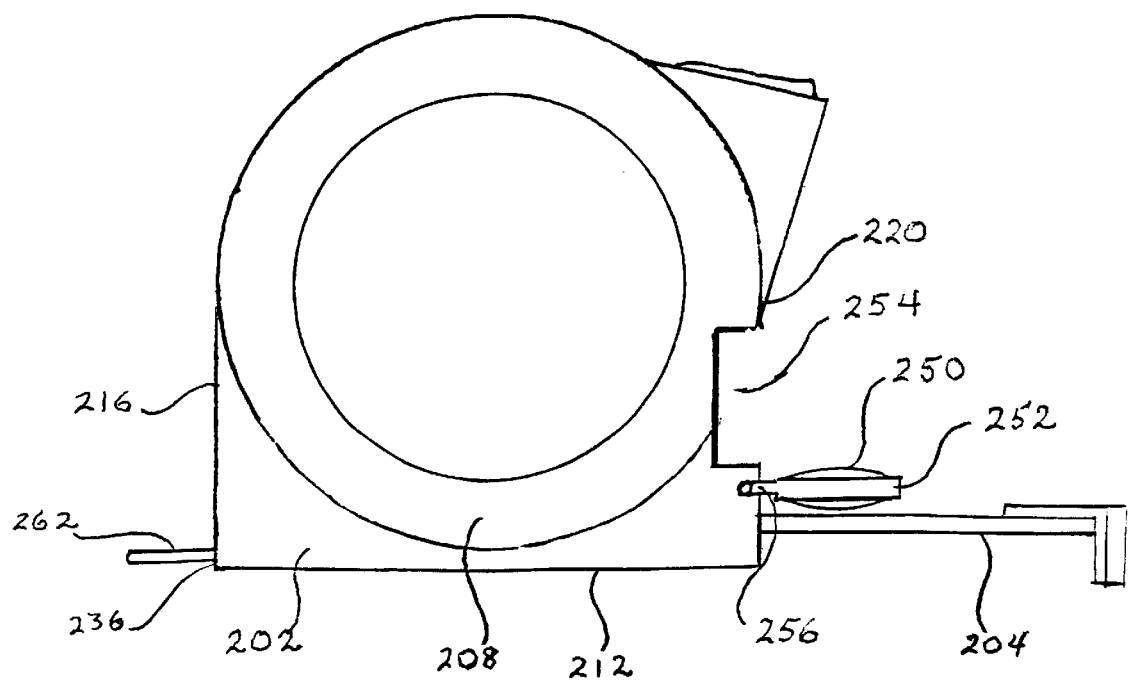
FIG. 5 is an elevation view of a tape measure case showing the magnifying glass and carrier pivoted to the in use or operational position over a portion of the partially extended measuring tape.
Figure 6:
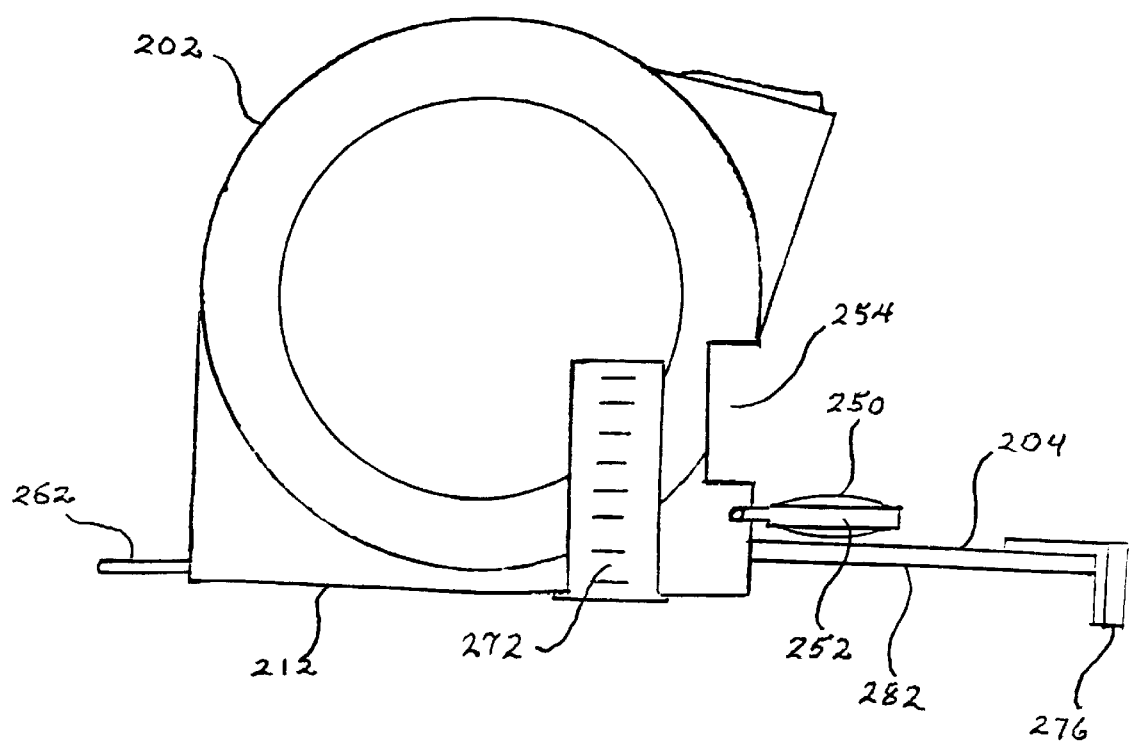
FIG. 6 is an elevation view of a tape measure and accessories assembly in accordance with this invention having a rip-saw guide carried in a recess provided in a side wall of the tape measure case, showing the rip-saw guide fully retracted into its recess.
Figure 7:
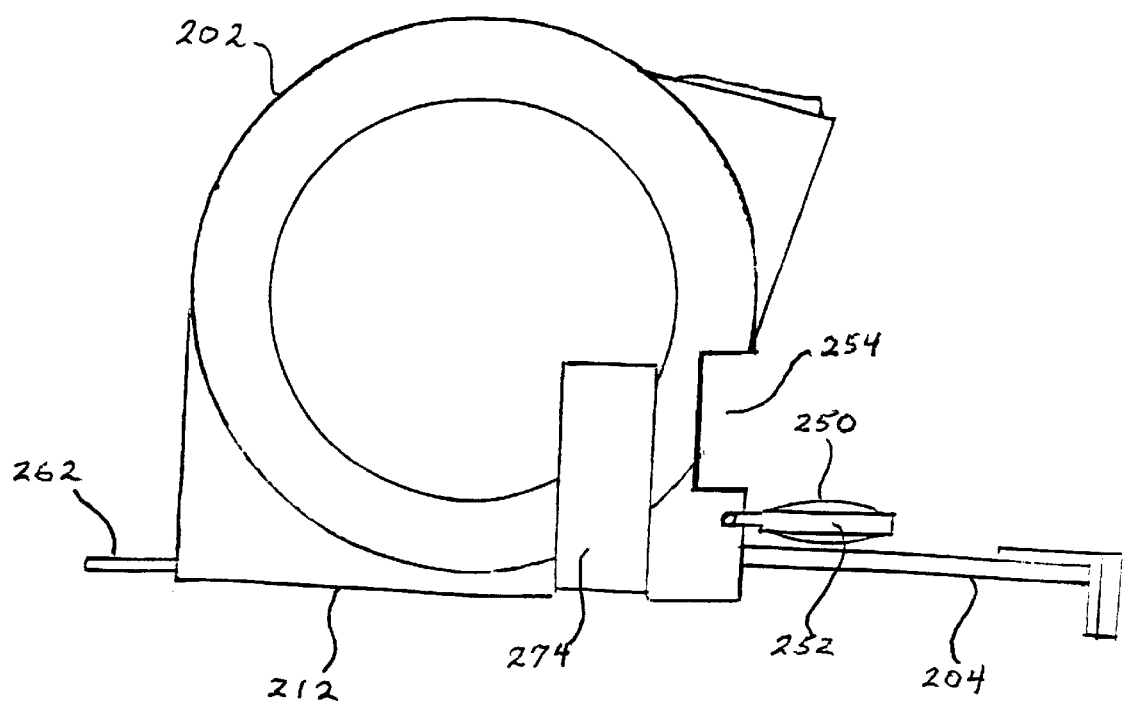
FIG. 7 is an elevation view as seen in FIG. 6 but with the rip-saw guide removed to illustrate the recess therefore.
Figure 8:
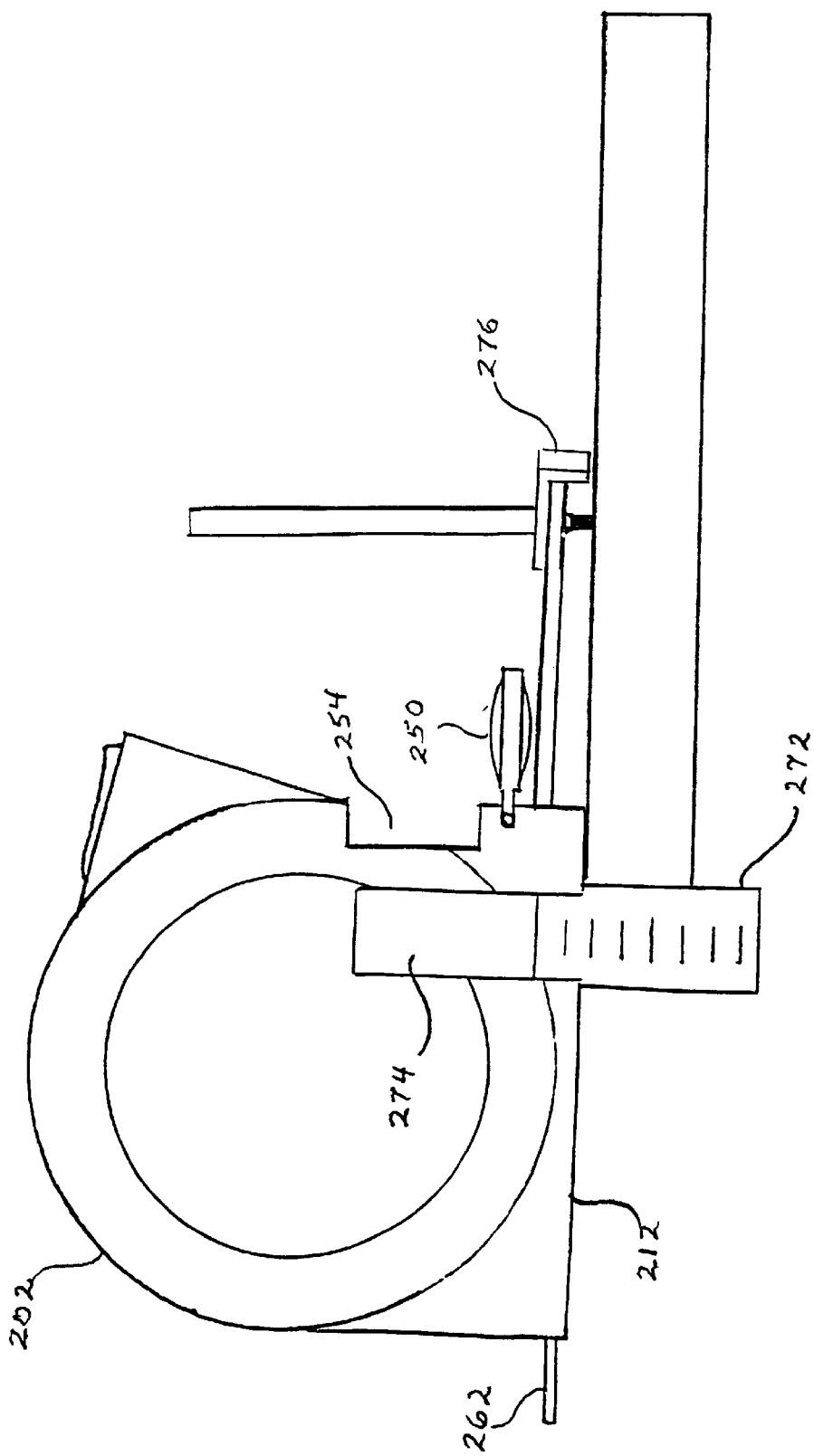
FIG. 8 is an elevation view of the tape measure and accessories assembly as shown in FIG. 6 with the rip-saw guide extended to its operational position, and showing how it is positioned against the side edge of a board to be moved along with the measuring tape extended to the desired location for marking the rip-saw line with the pencil shown through a marking hole provided at the end of the measuring tape.
Figure 9:
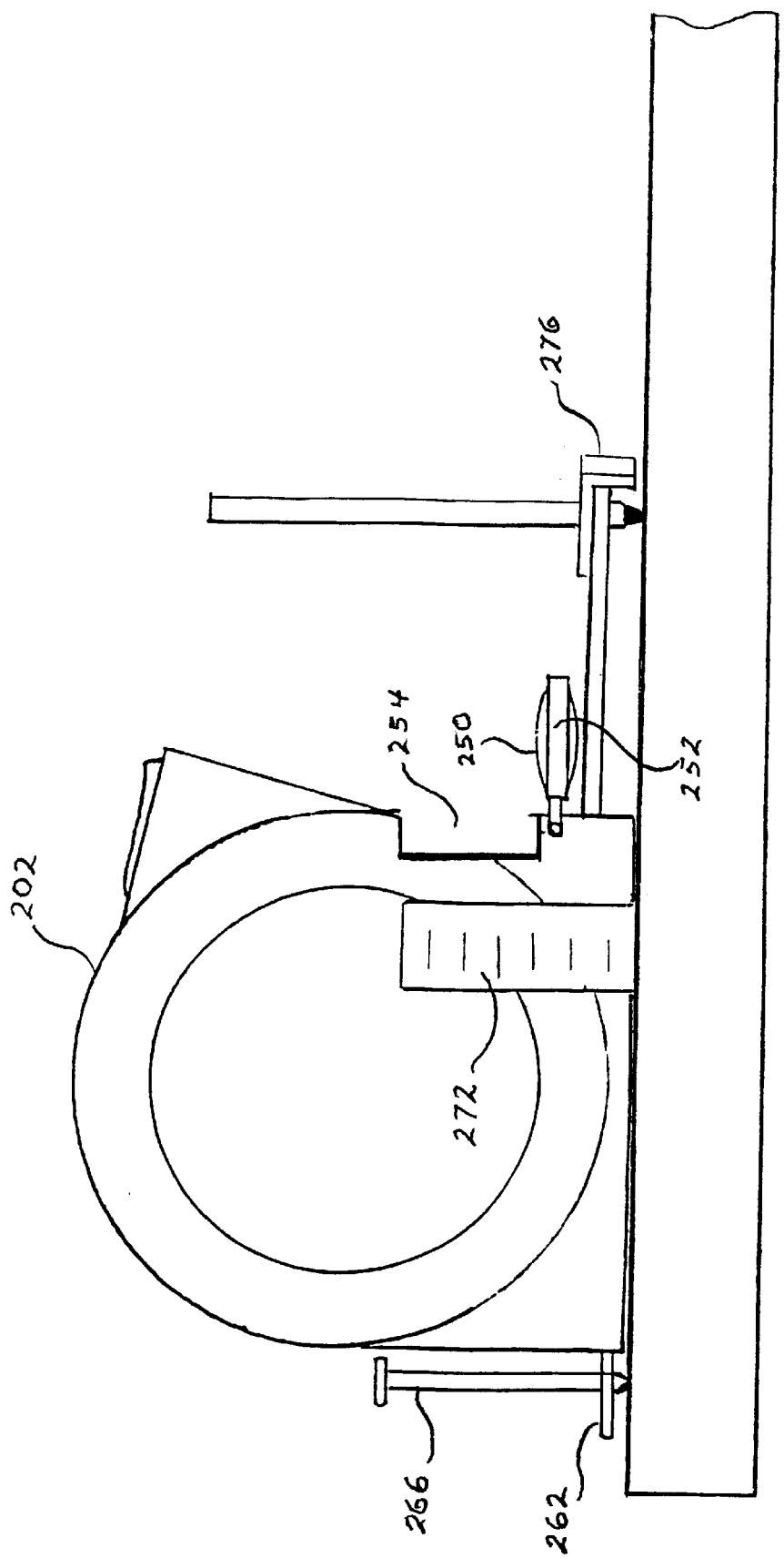
FIG. 9 is a an elevation view of a tape measure and accessories assembly in accordance with this invention having a positioning member extendable from the rear wall of the tape measure case, having a pivot hole therein to receive a pivot pin such as a nail as shown to slightly embed in the work piece for holding the tape measure case in position for pivoting around such nail as the extended measuring tape having a pencil through its marking hole at the outer end is pivoted to mark an arcuate line on the work piece.
Figure 10:
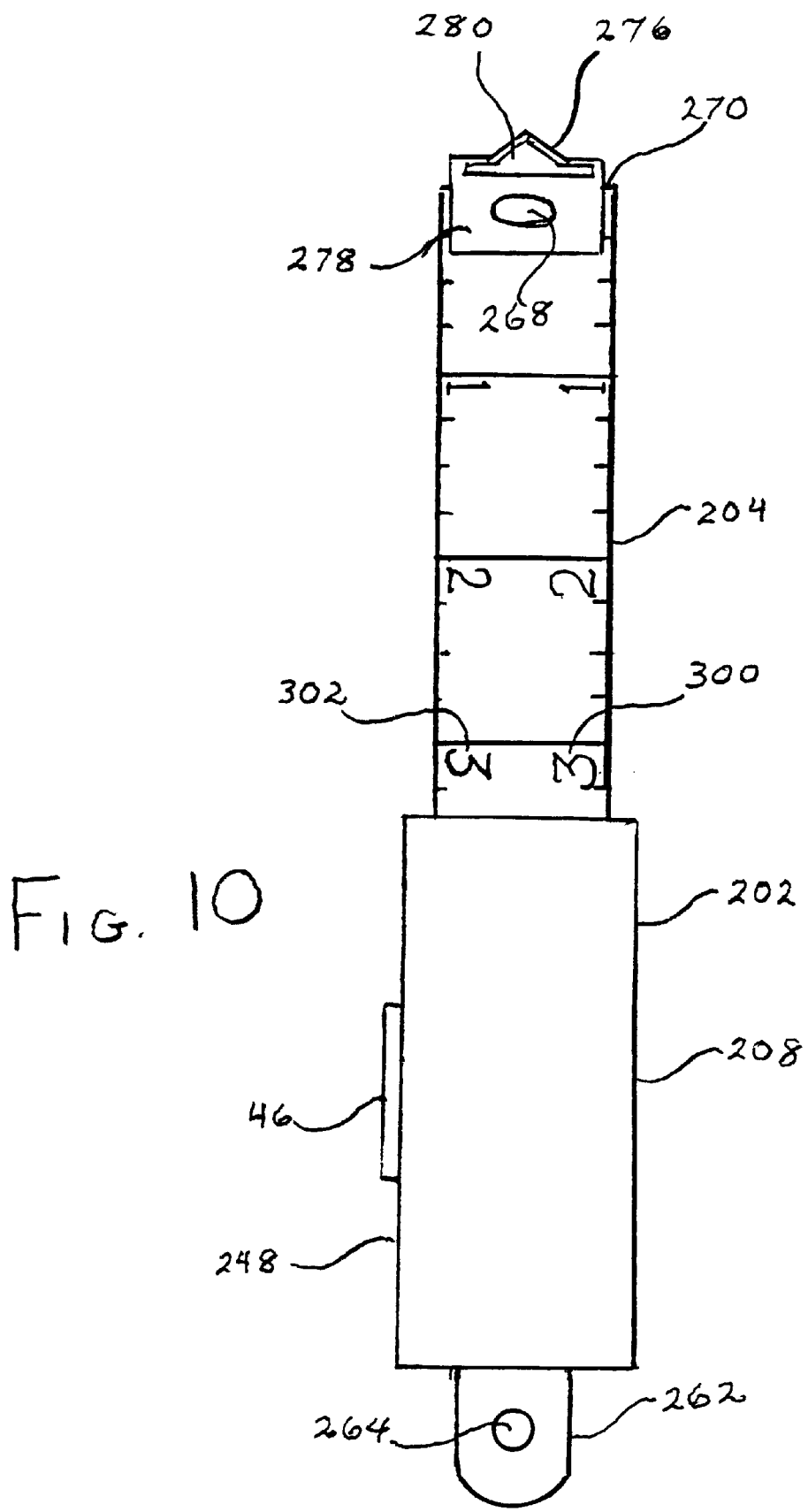
FIG. 10 is a plan view of a tape measure and accessories assembly in accordance with this invention to show the pivot hole in the rearwardly extending positioning member and to show the V-notch in the hand grasp member secured to the outer end of the measuring tape.
Figure 11:
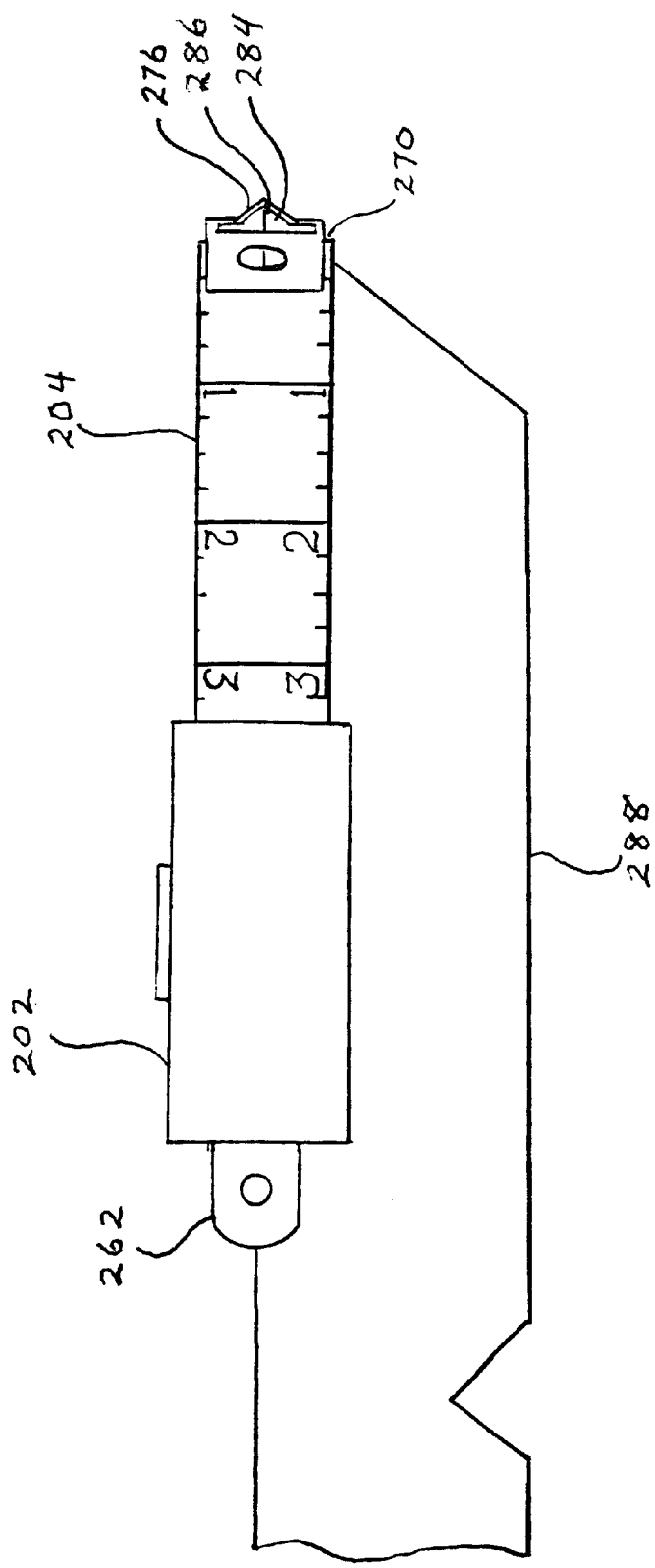
FIG. 11 is an elevation view of a rafter and a plan view of the tape measure and accessories assembly shown in FIG. 10 but reduced in size, showing how the acute-angled or pointed end of the rafter is received in the V-notch at the outer end of the measuring tape to hold it in place hands-free.
Figure 12:
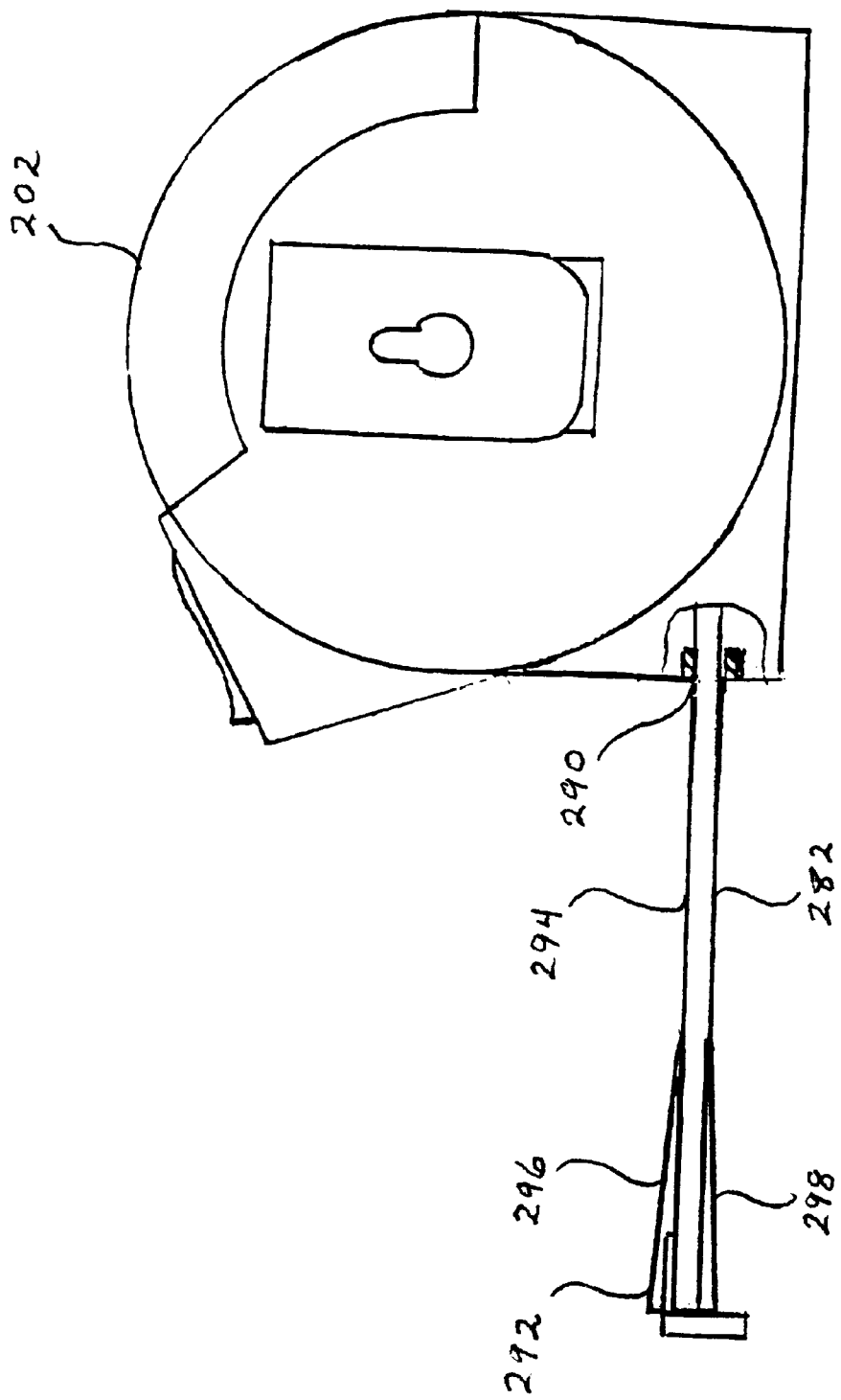
FIG. 12 is an elevation view of a tape measure and accessories assembly in accordance with this invention having a return-retard construction at the outer end of the measuring tape to prevent overly rapid return into the cavity of the tape measure case, comprising an outwardly flared or tapered end region of the measuring tape to increase frictional engagement with the edges of the narrow entrance slot thereby acting as a brake to gradually slow return of the outer end portion of the measuring tape into the cavity of the tape measure case.

A tape measure case 2 in accordance with this invention includes a coiled tape measure 4 therein, movable between a fully coiled position within the case 2 and a fully uncoiled position wherein the tape measure is extended outwardly from the case 2. The coiled tape measure 4 is spring biased toward the fully coiled position.

A miniature builder's square 6 is provided along the side wall 8 of the tape measure case 2. The square 6 includes a planar base 10 extending along and adjacent to the bottom wall 12 of the tape measure case 2, from a first end 14 of the planar base 10 adjacent the rear wall 16 of the tape measure case 2 to terminate forwardly at a second end 18 about one inch forwardly of the front wall 20 of the tape measure case 2.

The miniature square 6 extends upwardly from its forward second end 18 a short distance in a vertical leg 22, which is integrally joined to a diagonal leg 24 that extends at a forty-five degree angle to the planar base 10. The diagonal leg 24 terminates upwardly at the junction 26 with an upper horizontal leg 28 about one and a half inches long which extends in a straight line about one-half inch above the highest point of the arcuate upper wall 30 of the tape measure case 2. The miniature square 6 includes an elongated vertical leg 32 which extends from its upper end 34 integrally joined with the rearmost end of the upper horizontal leg 28 downwardly to terminate at a lower end 36 that is integrally joined with the first end 14 of the planar base 10.

The planar base 10 extends outwardly from the rest of the miniature square 6 about a half-inch, having a planar upwardly facing surface 38 and an opposite downwardly facing planar surface 40.

The diagonal leg 24 of the miniature square 6 includes a plurality of angle markings 42 for use in marking the angle to be cut across a rafter or other item. The elongated vertical leg 32 includes a plurality of linear measurement markings 44, such as inches and fractions of inches.

The tape measure case 2 includes a belt clip 46 on its side wall 48 opposite side wall 8.

The miniature square 6 may be integrally formed with the tape measure case 2, or it may be secured to the case 2 by screws or other releasable securing means and removable therefrom.

In one embodiment of the invention, the tape measure case 202 includes a magnifying glass 250 mounted in a small carrier member 252 that is pivotally mounted along the front wall 220 of the tape measure case 202, to pivot between a stored position wherein the carrier member 252 is seated in a receiving recess 254 in the front wall 220 and an operational position wherein the carrier member 252 is pivoted to extend outwardly from the front wall 220 at a substantially right angle or normal thereto, a short distance above the measuring tape 204 when it is extended out from the case 202. The magnifying glass 250 is thereby positioned over the numbers on the measuring tape 204 to magnify the numbers making them easier to read with increased accuracy.

The carrier member 252 includes a pair of spaced apart pivot arms 256 which extend rearwardly thereof, each having inwardly projecting lugs 258 at their rearmost end to seat in respective pivot recesses 260 in the respective side walls 208 and 248 of the tape measure case 202.

A short retractable positioning member 262 is provided to extend from the rear wall 216 of the case 202 near its lower end 236 having a pivot hole 264 for a pivot pin such as a nail 266 to extend through and into the surface of an item on which the case 202 is placed for the purpose of drawing an arc thereon. The measuring tape 204 includes a marking hole 268 through its outer end 270, so when extended a desired distance a marking instrument such as a pencil can have its pointed marking end inserted into and through the marking hole 268. While a pivot pin through the pivot hole 264 of the positioning member 262 and into the surface of the item to be marked holds the case 202 from movement other than pivoting movement, a workman holding the marking instrument extending through the marking hole 268 of the extended measuring tape 204 can then urge the measuring tape 204 and case 202 around in an arc to mark a circle or arc on the surface of the item. The marking hole 268 has a width and length dimension corresponding to that of the marking point of a carpenter's pencil.

The measuring tape case 202 also includes a retractable ripping guide member 272, slidable inwardly and outwardly of a receiving recess 274 in the side wall 208 of the case 202. The receiving recess opens downwardly to the bottom wall 212 of the case, and is also open along its side wall having undercut grooves along each side of the recess 274 to slidably receive respective edge portions of the ripping guide member 272 to hold it in the recess as it slides in and out.

The ripping guide member comprises an elongated planar member. When it is moved to its extended position for use, the ripping guide member 272 extends below the bottom wall 212 of the case. The ripping guide member 272 is then placed against the edge of a board that is to be rip sawed. The measuring tape 204 is extended outwardly to the selected point on the board for marking the rip saw line. A marking instrument such as a pencil is then placed through the marking hole 268, and with the measuring tape 204 held at the selected distance the case 202 and marking instrument through the marking hole 268 are moved along the length of the board with the ripping guide member held against the edge of the board, to thereby mark the desired rip saw line on the board.

The measuring tape 204 includes a configured hand grasp member 276 at its outer free end. The hand grasp member 276 includes a short plate portion 278 which is riveted to the free end of the measuring tape 204, and a configured abutment portion 280 which extends normal to the undersurface 282 of the measuring tape 204. The abutment portion 280 includes the configuration of a V-notch 284. In use, the V-notch 284 is positioned to receive the acuteangled end 286 of a rafter 288 or other item after which the tape measure case 202 is pulled back from that end to whatever length the workman has chosen at which to make another mark or another cut. The V-notch 284 holds the free end of the measuring tape 204 in place at the acute-angled end of the work piece without the need for the workman himself to do so, thus freeing both of his hands to perform other parts of the work.

The hand grasp member 276 is preferably made of iron or an iron alloy and is magnetized. Thus, the free end of the measuring tape 204 can be used to extend out as far as necessary for reaching down, or reaching out, to an otherwise inaccessible place for retrieving a screw, nail, or other magnetic receptive item that has somehow gotten into that otherwise inaccessible location.

The measuring tape 204 is received into the cavity of the case 202 through a relatively narrow receiving slot 290. In order to prevent overly rapid return of the spring loaded measuring tape 204 when its free end is released, the outer end portion 292 is tapered outwardly beginning about one inch inwardly from the outer free end. The tapered outer end portion has a gradually increasing thickness either above the upper surface 294 of the measuring tape 204, or below the undersurface 282 thereof, or both above and below, to reach a dimension sufficiently greater than the corresponding dimension of the narrow receiving slot 290 to act as a frictional brake to slow return of the measuring tape 204 through the slot 290 and into the cavity of the case 202.

The tapering outer end portion 292 may include a first strip of tapered compressive material 296 such as rubber adhered to the upper surface 294 of the measuring tape at its outer end, and a second strip of tapered compressive material 298 adhered to its undersurface 282.

The upper surface 294 of the measuring tape 204 includes two sets of linear measurement numbers and markings, including the first set of linear marking numbers 300 which can be read in their proper position by a workman standing on one side of the measuring tape, and the second set of linear marking numbers 302 that can be read in their proper position by a workman standing on the opposite side of the measuring tape.

A drainage hole 304 is provided in the bottom wall 212 of the tape measure case 202 for water to drain out. Water can accumulate within the cavity of the tape measure case from rainwater, snow and other moisture that accumulates on the measuring tape when it is extended and drawn back into the cavity during outdoor use in rainy or snowy weather.

I claim:

1. A tape measure case having a coiled tape measure therein in combination with a miniature square, wherein said tape measure case includes a first side wall, a second side wall, a bottom wall, a front wall, a back wall and an upper wall, wherein said miniature square is positioned along said first side wall of said tape measure case, wherein said miniature square includes a planar base member that extends along said bottom wall of said tape measure case from a first base member end adjacent the said back wall of said tape measure case to said front wall thereof, wherein said planar base member that extends along said bottom wall of said tape measure case from a first base member end adjacent the said back wall of said tape measure case extends to a second base member end a short distance beyond said front wall thereof, wherein said miniature square includes a first leg member extending upwardly from said second base member end to terminate upwardly in a first leg member upper end, wherein said miniature square includes a diagonal leg member extending upwardly at a diagonal from said first leg member upper end to terminate at a diagonal leg member upper end, wherein said miniature square includes an elongated vertical leg member that extends upwardly from said first base member end of said planar base member to terminate at a vertical leg member upper end, said elongated vertical leg member being longer than said first leg member which extends upwardly from said second base member end, said first leg member being substantially parallel to said elongated vertical leg member, said diagonal leg member upper end being spaced apart from said vertical leg member upper end, wherein said miniature square includes an upper horizontal leg member extending from said diagonal leg member upper end to said vertical leg member upper end, said horizontal leg member being substantially parallel to said planar base member.

2. A tape measure case having a coiled tape measure therein in combination with a miniature square as set forth in claim 1, wherein said diagonal leg member includes angle markings thereon and said elongated vertical leg member includes linear measurement markings thereon.

3. A tape measure case having a coiled tape measure therein in combination with a miniature square as set forth in claim 1, wherein said planar base member includes a planar upwardly facing surface that extends outwardly from said legs of said miniature square about one-half inch, and includes a downwardly facing planar surface.

4. A tape measure case in combination with a miniature square as set forth in claim 1, an entrance slot in said tape measure case, a coiled measuring tape therein movable outwardly from and inwardly of said case through said entrance slot, said measuring tape being biased toward movement inwardly of said case, said tape measure case having a magnifying lens to position over said measuring tape when extended outwardly from said case.

5. A tape measure case in combination with a miniature square as set forth in claim 4, including a carrier for said magnifying lens, said carrier being movable between an in position for use position and an out of position for use position.

6. A tape measure case in combination with a miniature square as set forth in claim 5, wherein said carrier for said magnifying lens is pivotally mounted on said case for pivotal movement between said in position for use position and said out of position for use position.

7. A tape measure case in combination with a miniature square as set forth in claim 5, including a recess in said case to receive said carrier when pivoted to said out of position for use position.

8. A tape measure case in combination with a miniature square as set forth in claim 1, an entrance slot thereto, a coiled measuring tape therein movable outwardly from and inwardly of said case through said entrance slot, said measuring tape being biased toward movement inwardly of said case, said tape measure case having a back wall, a positioning member extending therefrom, a positioning hole through said positioning member to receive a pivot member therethrough around which said case may then be pivoted, said measuring tape having an outer free end, a marking hole through said measuring tape at its said outer free end to receive the marking end of a marking instrument therethrough to mark an arcuate line as said case is pivoted around said pivot member through said positioning hole.

9. A tape measure case in combination with a miniature square as set forth in claim 1, an entrance slot thereto, a coiled measuring tape therein movable outwardly from and inwardly of said case through said entrance slot, said measuring tape being biased toward movement inwardly of said case, said tape measure case having a ripping guide member, a ripping guide member recess, said ripping guide member being receivable into said ripping guide member recess and movable out therefrom, said ripping guide member extending downwardly from said tape member case when extended out therefrom for bearing against the side edge of a board that is to be rip sawed as said case with said measuring tape extended to a selected position on said board is moved therealong, a marking hole through said measuring tape at its outer free end to receive the marking end of a marking instrument therethrough for marking a rip saw line of said board as said case is moved along said board with said ripping guide member against said side edge of said board.

10. A tape measure case in combination with a miniature square as set forth in claim 1, an entrance slot thereto, a coiled measuring tape therein movable outwardly from and inwardly of said case through said entrance slot, said measuring tape being biased toward movement inwardly of said case, said measuring tape having an outer free end, an upwardly facing surface and an opposite downwardly facing surface, an end piece affixed to said outer free end of said measuring tape, said end piece having a short downwardly extending wall portion, a V-notch in said downwardly extending wall portion to receive a correspondingly configured end of a work piece with which a workman is using said tape measure case and measuring tape.

11. A tape measure case in combination with a miniature square as set forth in claim 10, wherein said end piece is magnetized.

12. A tape measure case in combination with a miniature square as set forth in claim 10, wherein said measuring tape includes a portion extending inwardly from said outer free end thereof that thickens and tapers outwardly as it approaches said outer free end to reach a thickness sufficiently greater than the corresponding dimension of said entrance slot to frictionally engage said outwardly tapered and thickened portion and slow return of said inwardly biased measuring tape into said tape measure case.

13. A tape measure case in combination with a miniature square as set forth in claim 1, an entrance slot thereto, a coiled measuring tape therein movable outwardly from and inwardly of said case through said entrance slot, said measuring tape being biased toward movement inwardly of said case, said measuring tape having a first set of linear measurement numbers in readable position from one side thereof and a second set of linear measurement numbers oppositely positioned to be readable in the correct position from the opposite side of said measuring tape.

14. A tape measure case in combination with a miniature square wherein said miniature square includes a first pair of parallel spaced apart leg members, a second pair of parallel spaced apart leg members extending in a direction normal to the direction in which said first pair of parallel spaced apart leg members extend, wherein said miniature square includes a horizontal upper edge, a horizontal lower edge substantially parallel to said horizontal upper edge, a vertical first side edge, a vertical second side edge substantially parallel to said first side edge, and a diagonally extending leg member extending from said vertical second side edge in a direction toward said horizontal upper edge and terminating at said horizontal upper edge at a point spaced apart from said vertical first side edge to prevent any portion of said miniature square from projecting outwardly from and above said horizontal upper edge.

15. A tape measure case in combination with a miniature square wherein said miniature square includes a first pair of parallel spaced apart leg members, a second pair of parallel spaced apart leg members extending in a direction normal to the direction in which said first pair of parallel spaced apart leg members extend, wherein said miniature square includes a horizontal upper edge, a horizontal lower edge substantially parallel to said horizontal upper edge, a vertical first side edge, a vertical second side edge substantially parallel to said first side edge, and a diagonally extending leg member extending from said vertical second side edge in a direction toward said horizontal upper edge and terminating at said horizontal upper edge at a point spaced apart from said vertical first side edge to prevent formation of a sharply pointed end portion of said miniature square projecting outwardly and upwardly from said horizontal upper edge were said diagonally extending leg member and said first side edge to be extended above said horizontal upper edge to terminate at a point upwardly therefrom at which said diagonally extending leg member and said first side edge intersect.

* * * * *